United States Patent [19]
Kakizawa et al.

[11] Patent Number: 5,153,908
[45] Date of Patent: Oct. 6, 1992

[54] AUTOMATIC REDIAL IN A KEY TELEPHONE SYSTEM HAVING DIFFERENT LINE TYPES

[75] Inventors: Katsuhiro Kakizawa, Kawasaki; Shoichi Takashima, Tokyo, both of Japan

[73] Assignee: Canon Kabushiki Kaisha, Tokyo, Japan

[21] Appl. No.: 715,804

[22] Filed: Jun. 14, 1991

[30] Foreign Application Priority Data

Jun. 19, 1990 [JP]  Japan .................................. 2-158650
Oct. 18, 1990 [JP]  Japan .................................. 2-281498

[51] Int. Cl.⁵ ............................................. H04M 1/26
[52] U.S. Cl. ...................................... 379/157; 379/209
[58] Field of Search ................................ 379/157, 209

[56] References Cited

U.S. PATENT DOCUMENTS 4,958,369  9/1990  Tsuchida ............................. 379/157
5,034,948  7/1991  Mizutani et al. ...................... 370/79

FOREIGN PATENT DOCUMENTS 0042552  2/1988  Japan ................................. 379/157

*Primary Examiner*—Stafford D. Schreyer
*Attorney, Agent, or Firm*—Fitzpatrick, Cella, Harper & Scinto

[57] ABSTRACT

The type of an outside line acquired at the time of placing an outside-line call is identified, and an idle outside line of this same type is acquired when a call is placed to a party in an auto-repeat mode, thereby establishing the call to the party. Further, types of outside lines acquired preferentially at the time of originating an outside-line call are registered in advance, and idle outside lines are selected and acquired in accordance with the order of preference.

12 Claims, 13 Drawing Sheets

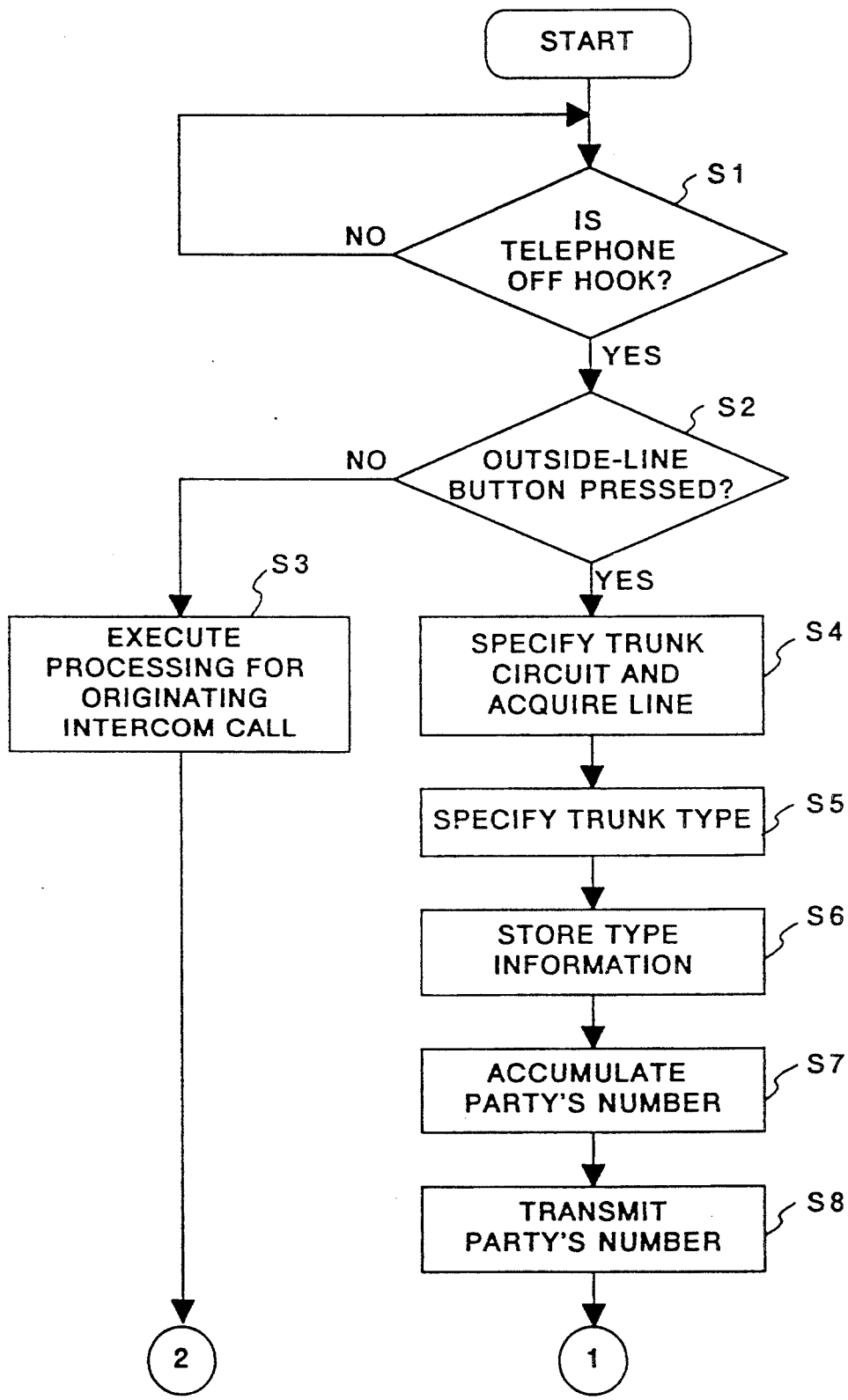
F I G. 2A

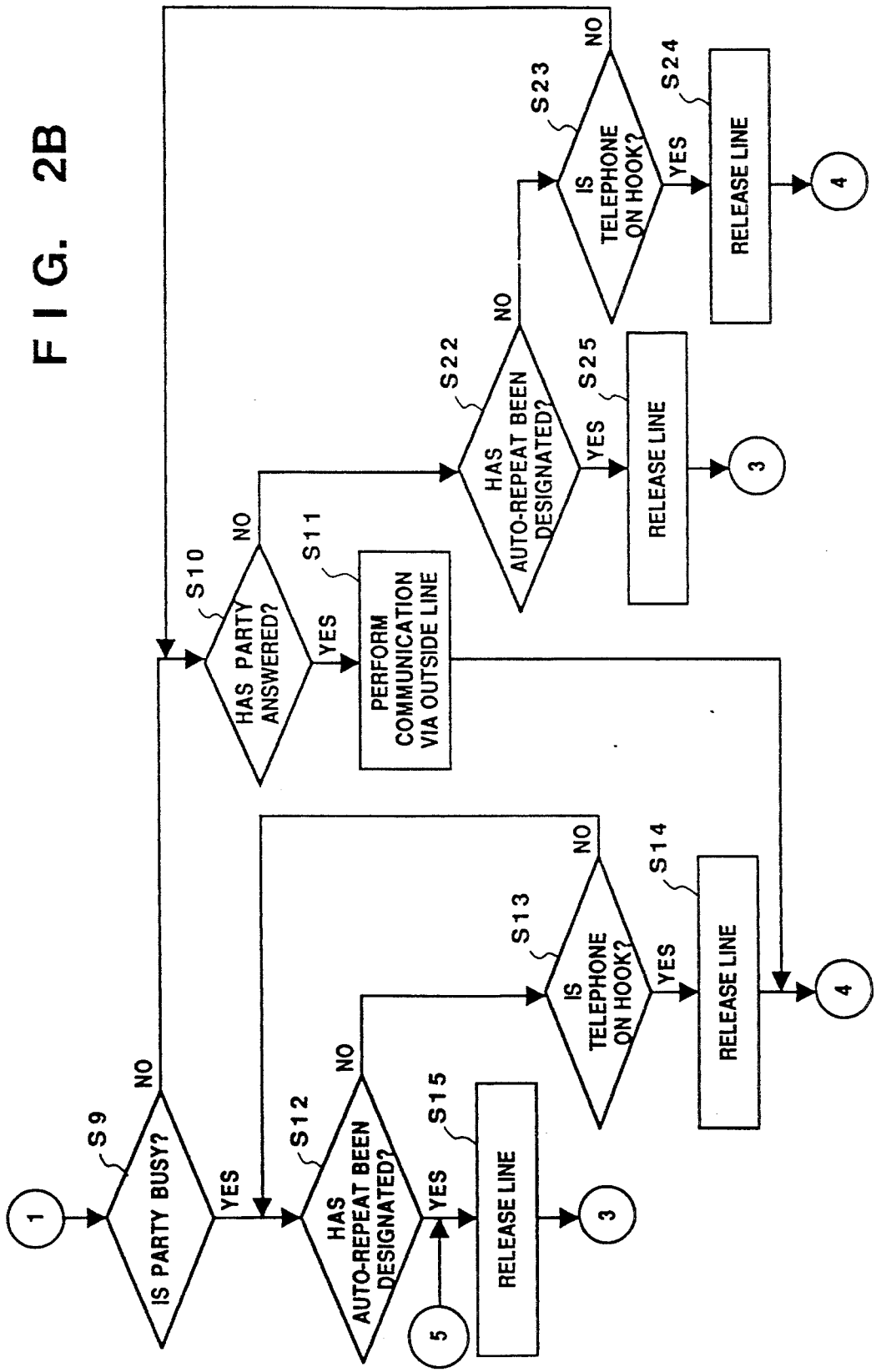

| TRUNK TYPE | DISPLAY DATA |
|---|---|
| 1 | PSTN |
| 2 | ISDN |
| 3 | PBX |

F I G. 3

| OUTSIDE-LINE BUTTON | TRUNK NO. |
|---|---|
| 1 | 6 |
| 2 | 5 |
| 3 | 4 |
| 4 | 3 |
| 5 | 2 |
| 6 | 1 |

F I G. 4

| TRUNK NO. | TRUNK TYPE |
|---|---|
| 1 | 1 |
| 2 | 1 |
| 3 | 2 |
| 4 | 2 |
| 5 | 3 |
| 6 | 3 |

F I G. 5

AUTOMATIC REDIAL IN A KEY TELEPHONE SYSTEM HAVING DIFFERENT LINE TYPES

BACKGROUND OF THE INVENTION

1. Field of the Invention

This invention relates to a communications system and, more particularly, to a communications system which accommodates a plurality of different types of lines.

2. Description of the Prior Art

Communications systems such as facsimile machines and telephones which have a so-called auto-repeat function (automatic redial function) are known in the art. With an auto-repeat function, the system repeatedly calls another party automatically at prescribed time intervals if a connection with the party cannot be established because the party is currently communicating, or for some other reason.

The auto-repeat function of a Key Telephone System is adapted to acquire, at redialing, the same line dialed the preceding time, or to perform a search in ascending or descending order in accordance with the physical accommodation position of the line in order to acquire a line which is idle.

Further, in a Key Telephone System, by way of example, conventionally an idle outside line is acquired by pressing an outside-line button on an extension telephone, or by pressing a button having a special number, such as 0, when the extension is in a state in which it is capable of initiating an intercom call.

In another arrangement, it is also possible to acquire an outside line, and to establish a state in which a transmission can be made with the outside line, by picking up a handset or by pressing a special button (e.g., a speaker button) on an extension telephone without lifting the handset.

However, in the conventional communications system having the auto-repeat function, at redialing a line is acquired without relation to the data dialed in at the time of the initial transmission. This leads to the following drawbacks:

(1) Ordinarily, the user dials in accordance with the acquired line and the party called. For example, the user dials "789-1111" when a call is placed through a public telephone network; "0-789-1111" when the call is placed to the same party through a PBX line; and a two- to four-digit number, for example, upon acquiring a PBX line, when another extension connected to the PBX line is dialed. Consequently, when a line of a different type is acquired at the time of a retransmission and the previous dial data is transmitted as is, erroneous dialing is the result.

(2) In a case where the line acquired is physically identical with that previously, this line, even if it is unused, is always the same as that reserved by the auto-repeat function, and therefore the line cannot be utilized by other extensions.

Further, in a case where the above-described conventional telephone system accommodates a plurality of mixed outside lines such as an analog PBX extension, a digital public switched telephone network and an international telephone line, the following problems arise:

(1) In a case where an outside-line button provided on an extension telephone is pressed to acquire an outside line, it is necessary to memorize to which button the desired line has been assigned. This is very troublesome.

(2) In a case where an idle outside line is acquired by dialing 0 or a special number or merely by picking up the headset, the user cannot determine the kind of outside line that has been acquired.

(3) When the user dials the other party without knowing the type of outside line in case (2) above, there is a very high probability that erroneous dialing will take place.

(4) Even an outside line of a type not desired for selection may be acquired if this line is idle.

(5) Since an idle outside line of a type desired for selection can be acquired by another extension as well, a busy signal or the like can be encountered so that the line cannot be used.

SUMMARY OF THE INVENTION

An object of the present invention is to provide a line selecting apparatus which selects an outside line of the type stored in memory or of the type manually designated in accordance with a mode.

Another object of the present invention is to provide a communications system in which the type of line originally acquired at the time of a transmission is identified and an idle line of a type identical with this line is acquired when an auto-repeat (automatic redial) call is made, thereby making it possible to utilize lines effectively, prevent erroneous dialing and reliably establish a connection with the party intended.

Another object of the present invention is to provide a communications system in which trunk type is registered in advance for every accommodated outside line, and priority-acquisition trunk type is registered in advance for every extension, whereby it is possible, at the time of a transmission using an outside line, for the originating extension to acquire the outside line to which the desired trunk type has been assigned.

Still another object of the present invention is to provide a communications system in which, even if an outside line of the desired trunk type cannot be acquired because it is busy, etc., at the time of an outside-line transmission, outside lines of trunk types having a lower ranking are searched sequentially to achieve acquisition, this being made possible by registering beforehand a plurality of priority-acqustion trunk types and assigning a ranking to them.

A further object of the present invention is to provide a communications system in which the trunk type of an outside line eventually acquired is read out at the time of an outside-line transmission, whereby the trunk type is displayed on display panel of the originating extension.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2A-2C are a flowchart illustrating a control procedure executed by the Key Telephone System of this embodiment;

FIG. 3 is a table showing the correspondence between trunk type and display data;

FIG. 4 is a diagram showing the correspondence between outside-line buttons and trunk numbers;

FIG. 5 is a diagram showing the correspondence between trunk numbers and trunk type;

DESCRIPTION OF THE PREFERRED EMBODIMENTS

First Embodiment

A first embodiment of the present invention will now be described in detail with reference to the drawings.

Figure 1:
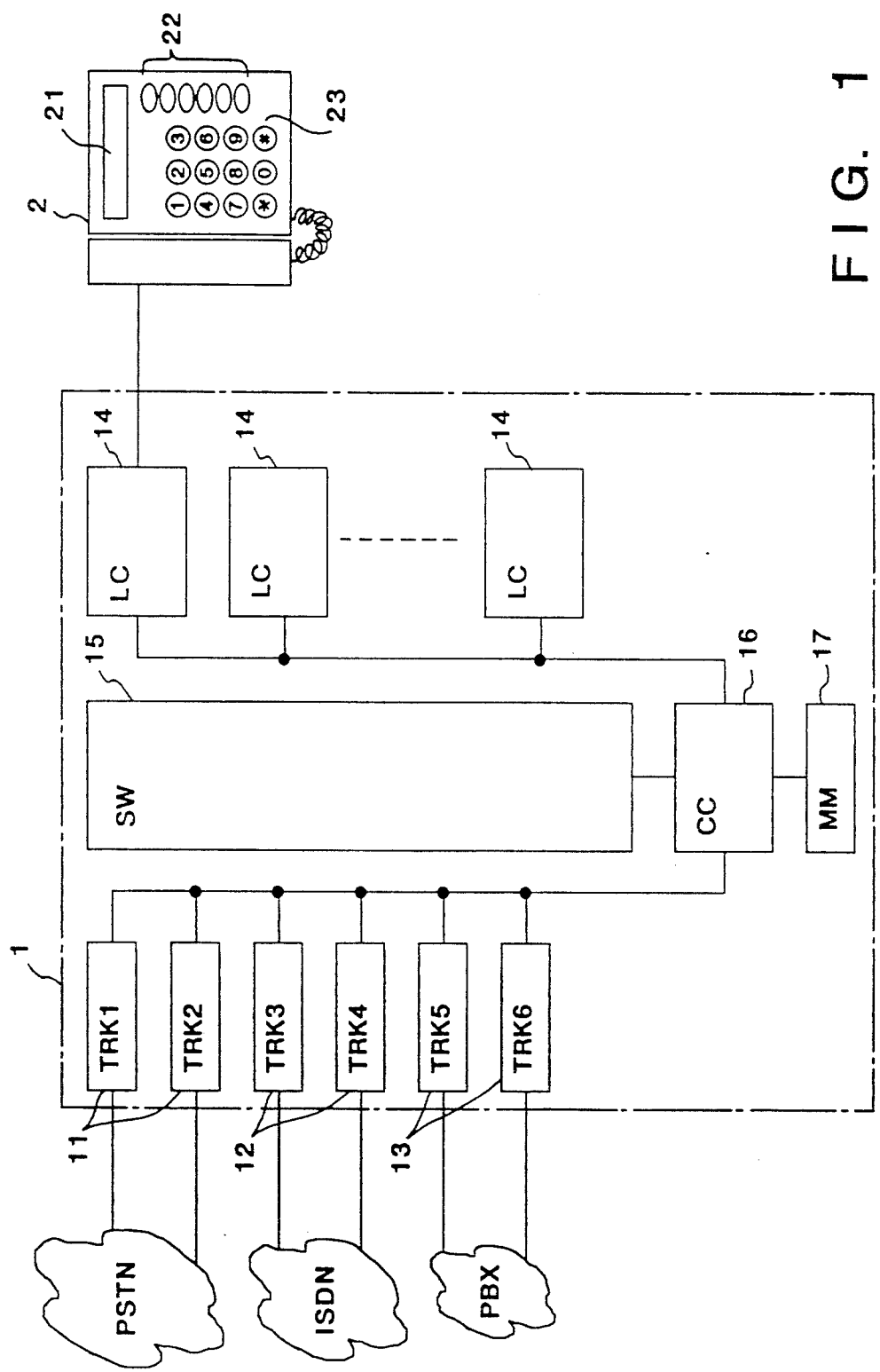
FIG. 1 is a block diagram illustrating the overall construction of a Key Telephone System according to a first embodiment of the present invention.

FIG. 1 illustrates the overall structure of a Key Telephone System serving as a communications system according to a first embodiment of the present invention. As shown in FIG. 1, the Key Telephone System includes a main unit 1 comprising trunk circuits 11 each having an interface for interfacing an ordinary public switched telephone network, trunk circuits 12 each having an interface for interfacing ISDN lines, trunk circuits 13 each having an interface for interfacing PBX lines, extension circuits 14 for interfacing extension telephones 2 (only one of which is shown), a switching circuit network 15 for, say, time division switching, a controller 16, such as a microprocessor, for controlling the overall system, and a memory 17 in which are stored data (described below) and the control program of controller 16.

The extension telephone 2 has a display panel 21 for displaying various information in response to a command from the main unit 1, as well as outside-line buttons 22. Pressing one of outside-line buttons 22 selects one of the lines accommodated in the trunk circuits TRK 1 through 6. The extension telephone 2 also has a keypad 23 for dialing an entering number(s).

In the arrangement described above, the telephone system accommodates two lines of an ordinary public switched telephone network (hereinafter referred to as a "PSTN"), two ISDN lines and two PBX lines, and therefore the extension telephone has a total of six outside-line buttons. In addition, the trunk circuits are correlated with respective ones of the outside-line buttons (1-6) in the manner shown in FIG. 4 by means of a maintenance console or the like.

Figure 5:
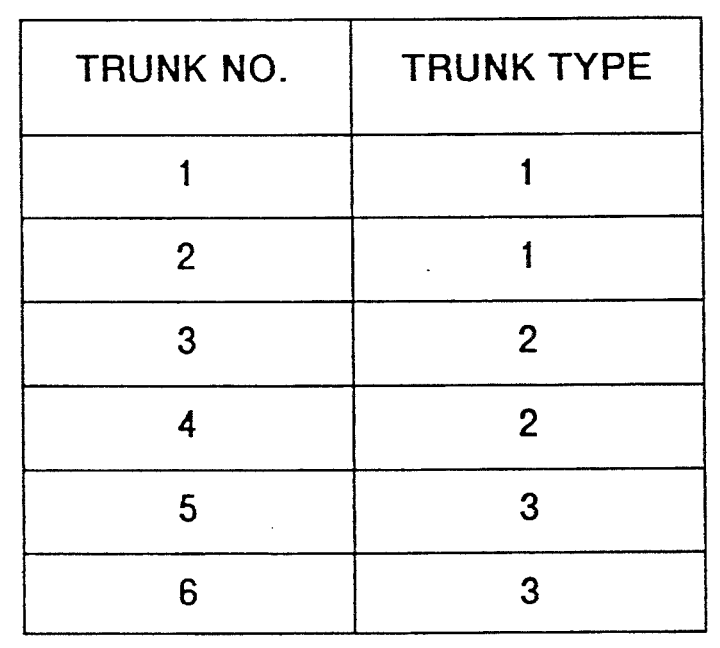

Data indicating trunk type is registered, as shown in FIG. 5, for every one of the trunk circuits 11 through 13 (TRK1-TRK6 in FIG. 1).

The items of data shown in FIGS. 4 and 5 are stored in the memory 17 of FIG. 1 as table data.

The trunk types 1-3 in FIG. 5 have the meanings shown in FIG. 3. When one of the outside-line buttons 22 is pressed, the "Display Data" shown in FIG. 3 is displayed on the display panel 21 of the extension telephone 2.

Figure 2C:
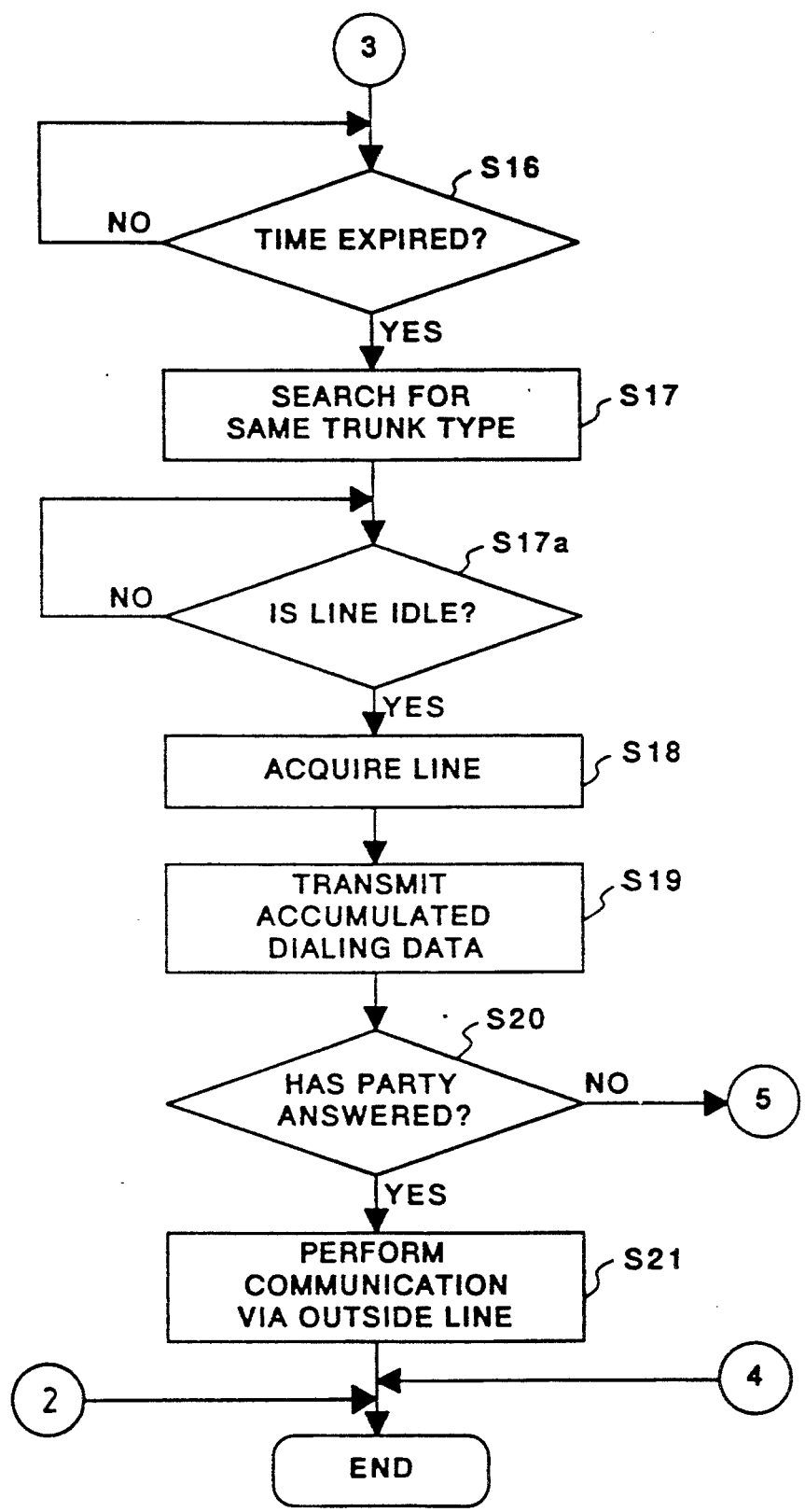

Reference will be had to the flowchart of FIG. 2 to describe a processing procedure when an auto-repeat function is implemented by the extension telephone 2 in this Key Telephone System. It is assumed that the illustrated procedure has been stored in the memory 17 as the control program of the control unit 16.

At step S1 in FIG. 2A, the control unit 16 monitors the on-hook/off-hook status of the extension telephone 2 via the extension circuit 14. If the phone is taken off the hook, it is determined at step S2 whether one of the outside-line buttons 22 has been pressed. If pressing of an outside-line button cannot be sensed at step S2, then the program proceeds to step S3, at which processing for originating intercom call from the extension telephone 22 is executed.

If pressing of an outside-line button is sensed at step S2, then the program proceeds to step S4, at which the control unit 16 specifies a trunk circuit by referring the table (FIG. 4) in memory 17 and acquires the corresponding line. Then, at step S5, trunk type from the table (FIG. 5) in memory 17 is specified, and the type information is stored in memory at step S6.

Thereafter, at steps S7 and S8, the data dialed in from the extension is accumulated and this data is transmitted to the acquired line. Following transmission of the dial data, the program proceeds to step S9 in FIG. 2B, where monitoring is performed to determine if the called party is busy.

If the party is not busy and starts to be called, the program proceeds from step S9 to step S10, at which an answer from the called party is awaited. If an answer is received, then telephonic communication is established with the outside line at step S11.

If the party is detected to be busy at step S9, or if an answer is not received from the party at step S10, monitoring is performed at step S12 or S22 to determine whether auto-repeat (automatic redial) has been designated by a special number entered from a numeric keypad 23 on the extension telephone 2 or a special number entered from a special function key (not shown) on the telephone 2.

If auto-repeat is not designated at step S12 or S22 and the extension telephone is found to be on the hook at step S13 or S 23, then the program proceeds to step S14 or S24, at which the line is released and processing is terminated.

If an auto-repeat designation is received at step S12 or S22, the program proceeds to step S15 or S25, at which the acquired line is freed. The system then waits for passage of a fixed period of time at step S16 in FIG. 2C.

At expiration of the fixed time period at step S16, the program proceeds to step S17. Here, based upon the trunk type stored at step S6, a trunk of the same type is retrieved from the table of FIG. 5, and then an idle line of this type is searched for at step S17a. In other words, in a case where the public switched telephone network has been selected by one of the outside-line buttons 22 at the time of the initial call, it is determined if either of the trunks TRK1, TRK2 is free.

If a corresponding trunk circuit is idle, this circuit is acquired at step S18 and then the dialed-in data stored at step S7 is sent out on this line as is at step S19.

Monitoring is performed at step S20 to determine if there is an answer from the party attempting to be called. If the party answers, telephonic communication with the outside line is established at step S21 and the auto-repeat operation is terminated.

If an answer from the party cannot be sensed at step S20 because, say, the party is busy, the program returns to step S15 and the processing from steps S15 to S20 is repeated.

In accordance with the embodiment described above, lines and trunk types corresponding to the lines are correlated in advance and stored in a table in the memory 17. When a retransmission is made in the auto-repeat mode, reference is had to the table to acquire an idle line of the same type as the line used in the initial transmission, and then redialing is performed using the acquired idle line. As a result, erroneous dialing due to a difference in the type of line used is prevented so that the user is capable of calling the desired party reliably by employing the auto-repeat function. During the time that the system is waiting to make a retransmission, another extension telephone is capable of utilizing this line. This has the effect of allowing efficient utilization of lines.

In the above-described embodiment, two sets of tables shown in FIGS. 4 and 5 are referred to in order to obtain the trunk type of the acquired line. However, it is permissible to adopt an arrangement in which the correspondence between the outside-line buttons and trunk circuits is fixed to establish an outside-line button = trunk circuit relationship, whereby trunk type is obtained using only the table shown in FIG. 5.

Further, in accordance with the flowchart of FIG. 2, retransmission is performed repeatedly an unlimited number of times until the party attempting to be called answers. However, the effects of the invention can be obtained even if the auto-repeat processing is terminated in response a certain number of retransmissions, elapsed time or current time.

Furthermore, the terminal is not limited to a key telephone. The same effects can be obtained even if a facsimile machine, data terminal or the like is used as the subscriber's terminal on the extension.

Second Embodiment

Figure 6:
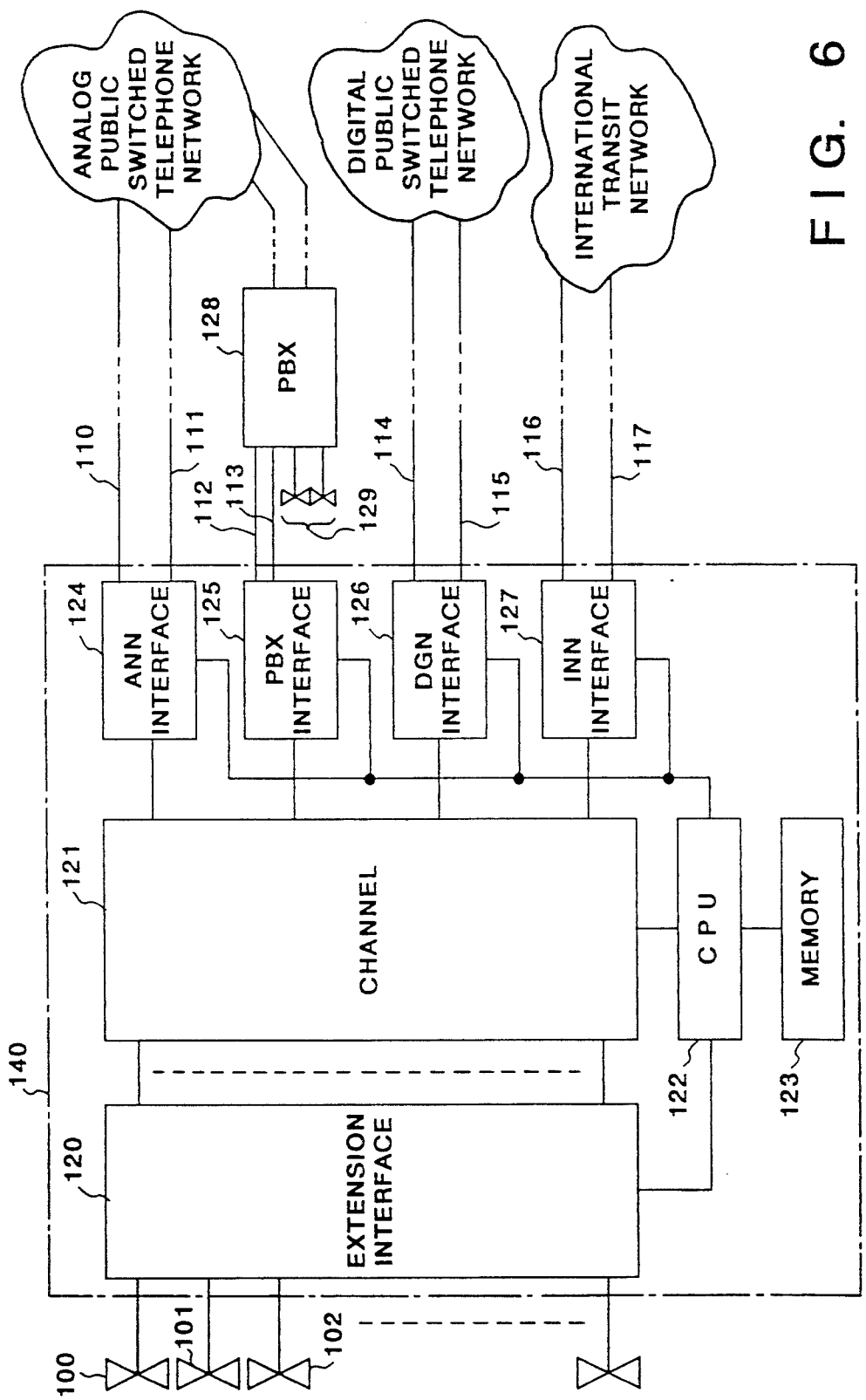
FIG. 6 is a block diagram showing the overall construction of a telephone exchange system according to a second embodiment of the present invention.

FIG. 6 is a block diagram illustrating the construction of a telephone exchange system according to a second embodiment of the present invention. As shown in FIG. 6, the telephone exchange system includes a main control unit 140 accommodating extension telephones 100-102 and outside lines 110-117. More specifically, the outside lines include analog public switched telephone network lines 110, 111 accommodated by an analog public switched telephone network interface (ANN interface) 124; PBX extension lines 112, 113 accommodated by an interface (PBX interface) 125 for PBX (private branch exchange); digital public switched telephone network lines 114, 115 accommodated by a digital public switched telephone network interface (DGN interface) 126; and international transit network lines 116, 117 accommodated by an international transit network interface (INN) 127.

The main unit 140 also includes an extension interface 120, a channel 121, a central processing unit (CPU) 122, and a memory 123 which stores a program for controlling this telephone exchange system, as well as control data.

Numeral 128 denotes a PBX (private branch exchange), and 129 an extension telephone accommodated by the PBX 128.

The extension telephones 100-102 are capable of communicating with the analog public switched telephone network, the PBX 128, the digital public switched telephone network and the international transit network via interfaces 124-127.

The CPU 122 detects key operation and the off-hook-/on-hook status of the extension telephones via the extension interface 120, and controls a display presented on the extension telephone. The CPU 122 detects also whether the lines 110-117 are in use or not, and stores the results of detection in the memory 123.

Figure 7:
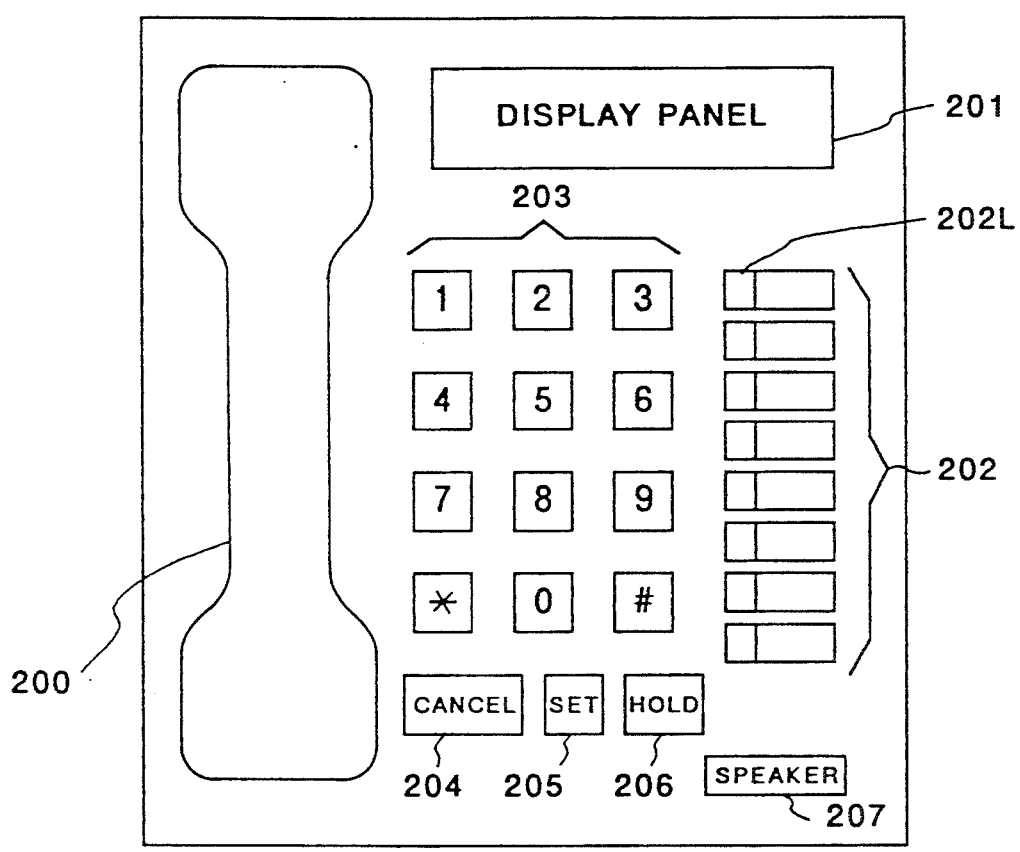
FIG. 7 is a plan view of an extension telephone.

FIG. 7 is a plan view of an extension telephone. As shown, the extension telephone includes a handset 200, a display panel 201 constituted by an LCD (liquid-crystal display cell) or the like, a set of outside-line buttons 202, a set of outside-line lamps 202L which light when the corresponding outside lines are in use, a numeric ten-key pad 203 for dialing, function keys 204-206, and a speaker key 207 which, by being pressed, performs a function equivalent to taking the handset 200 off the hook.

By pressing any of the outside-line keys 202, the operator is capable of selecting one of the outside lines 110-117 to establish telephonic communication.

Figure 8A:
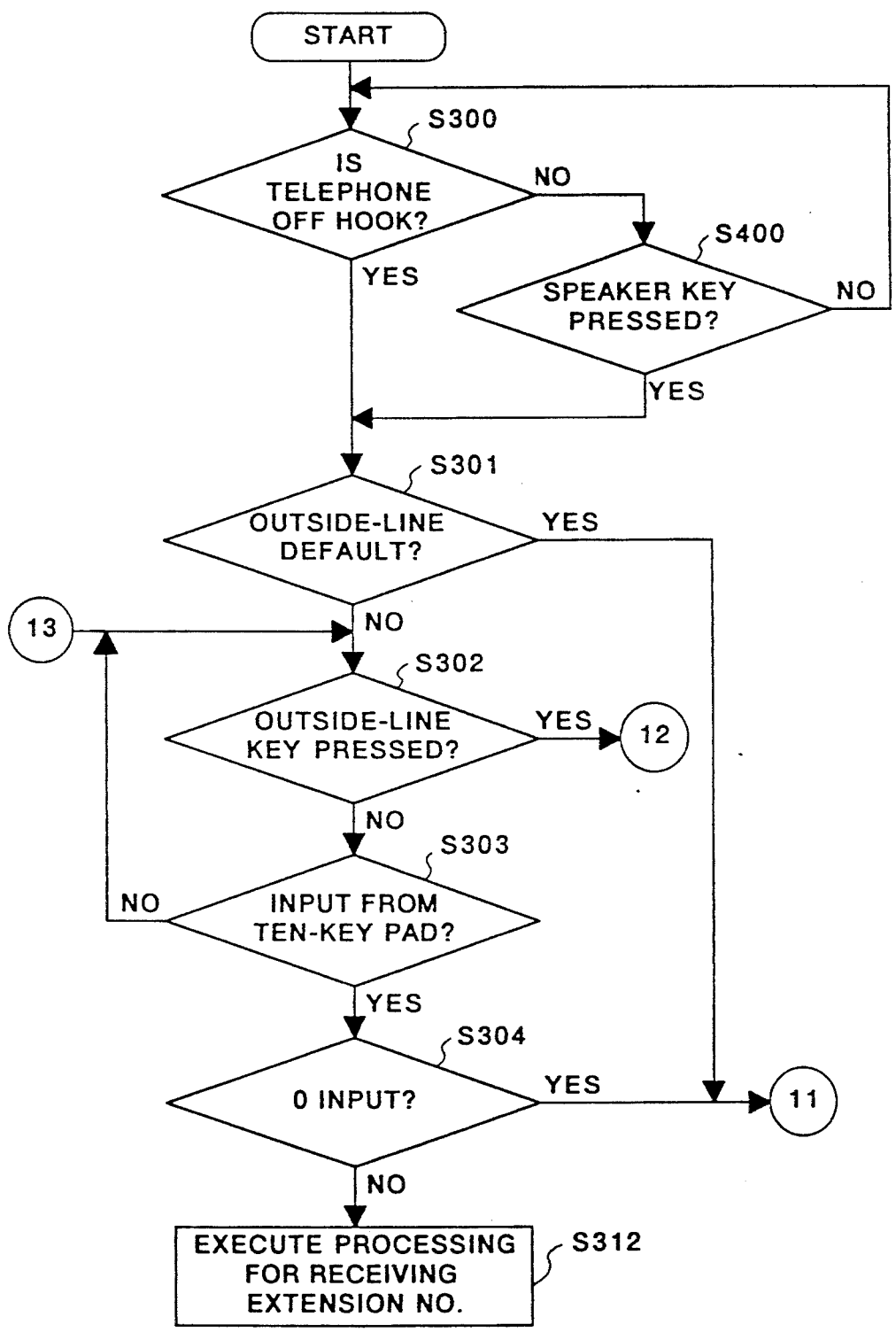
FIG. 8A, 8B are a flowchart illustrating a control procedure executed by the telephone exchange system of the second embodiment.
Figure 8B:
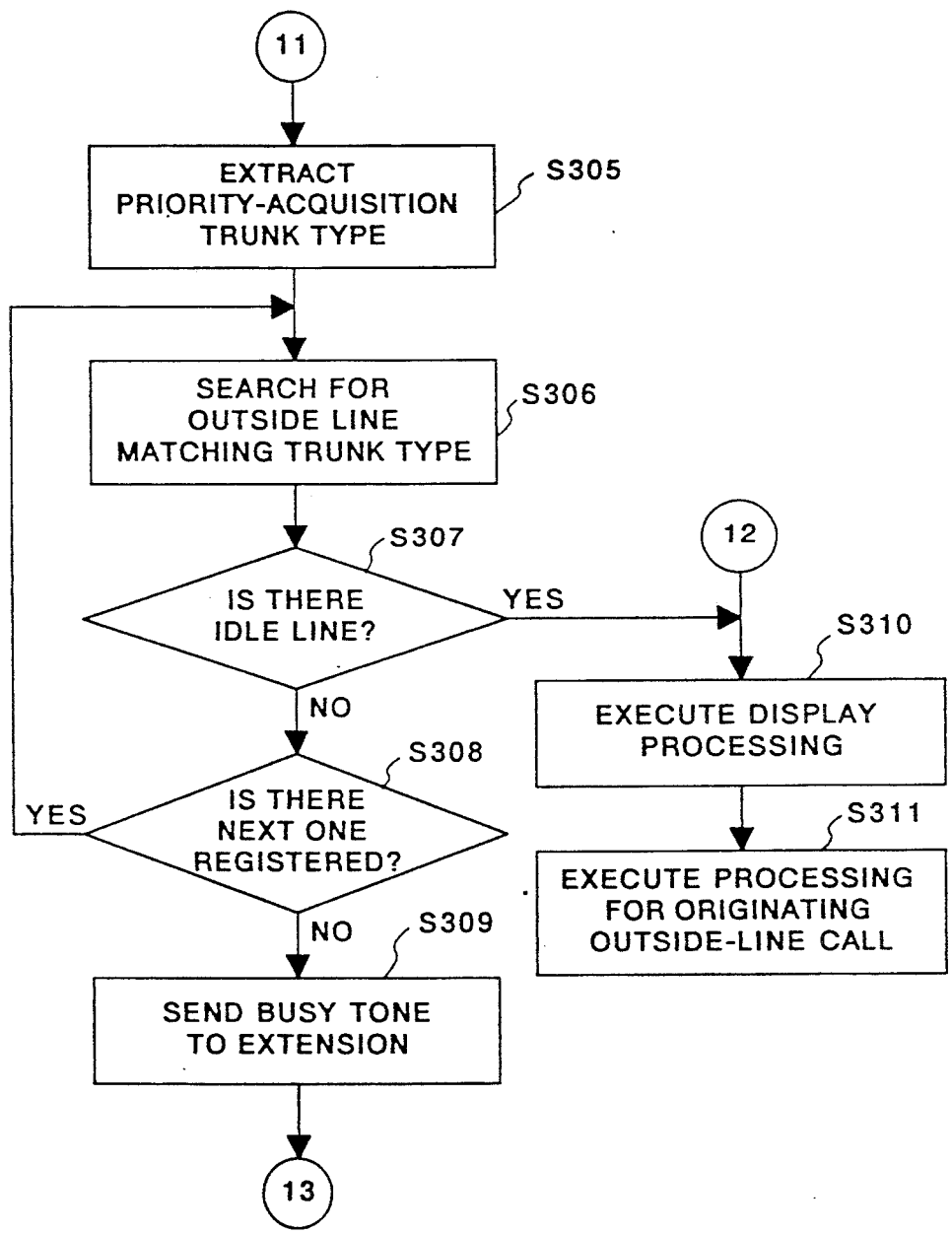

FIG. 8 is a flowchart illustrating the control procedure according to this embodiment of the present invention.

Figure 9:
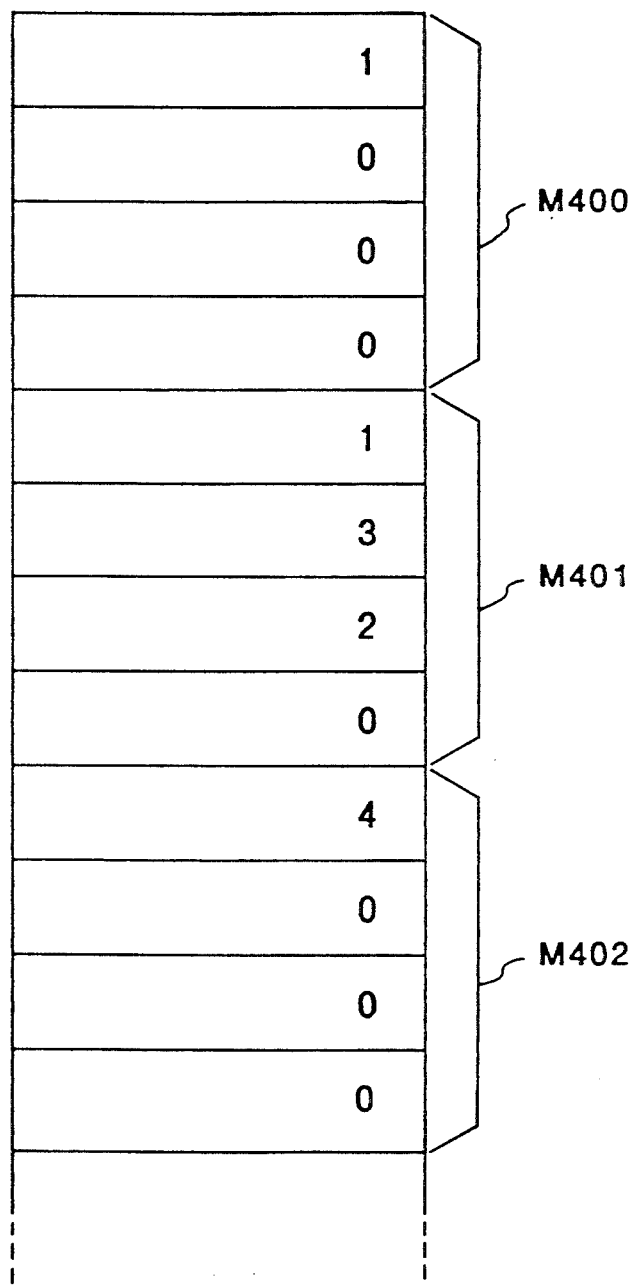
FIG. 9 is a diagram showing set data indicative of priority-acquisition trunk type corresponding to each extension telephone.

FIG. 9 illustrates data stored in the memory 123 for setting priority-acquisition trunk type classified by extension. Memory area M400 stores the data correlated with extension telephone 100. The data setting "1" represents the priority-acquisition trunk type. The three other data settings "0" in memory area M400 indicate that there are no other priority-acquisition trunk types registered for this extension telephone.

It should be noted that the data setting "1" represents correlation with an analog public switched telephone network line, "2" correlation with a PBX extension line, "3" correlation with a digital public switched telephone network line, and "4" correlation with an international transit network line.

The memory area M401 corresponds to the extension telephone 101, and the memory area M402 corresponds to the extension telephone 102.

Figure 10:
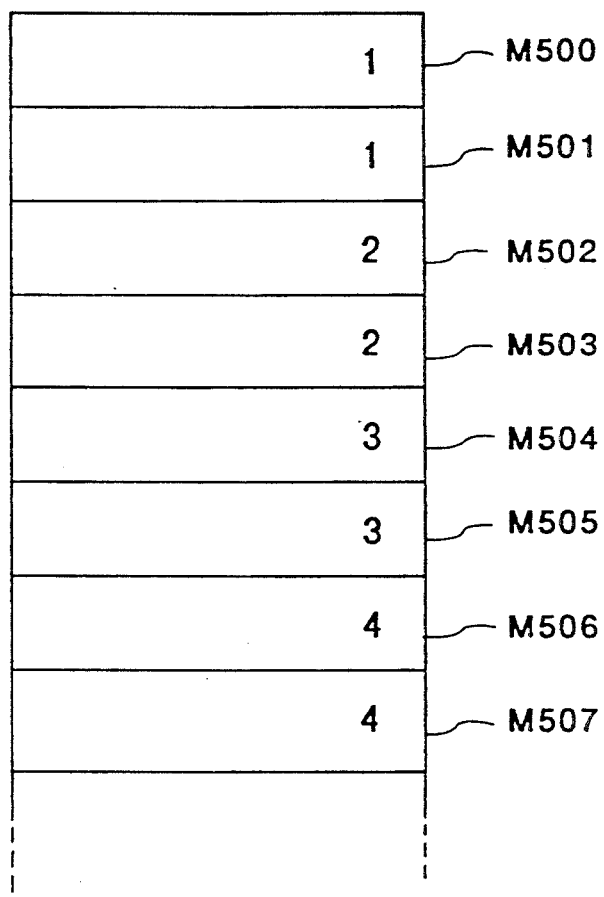
FIG. 10 is a diagram showing set data indicative of trunk type classified by outside line.

FIG. 10 illustrates data stored in the memory 123 for setting trunk type classified by outside line. Memory area M500 is set to correspond to the analog public switched telephone network line 100. Similarly, memory area M501 is set to correspond to analog public switched telephone network line 111; memory area M502 to PBX extension line 112; memory area M503 to PBX extension line 113; memory area M504 to digital public switched telephone network line 114; memory area M505 to digital public switched telephone network line 115; memory area M506 to international transit network line 116; and memory area M507 to international transit network line 117.

Figure 11:
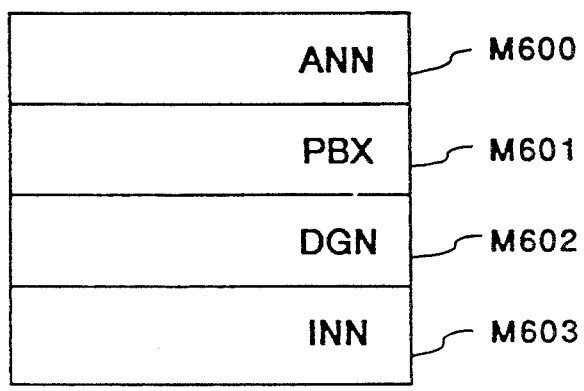
FIG. 11 is a diagram showing character data for displaying trunk type.

FIG. 11 illustrates character data stored in the memory 123 for the purpose of being displayed on the display panel of the extension telephone. Data displayed when an analog public switched telephone network line has been acquired is stored in memory area M600. Likewise, memory areas M601, M602, M603 correspond to the PBX extension lines, digital public switched telephone network lines and international transit network lines, respectively.

It should be noted that the items of data shown in FIGS. 10 and 11 are placed in a set mode by pressing a setting key 205 on the extension telephone and are registered by the ten-key pad 203.

Figure 12:
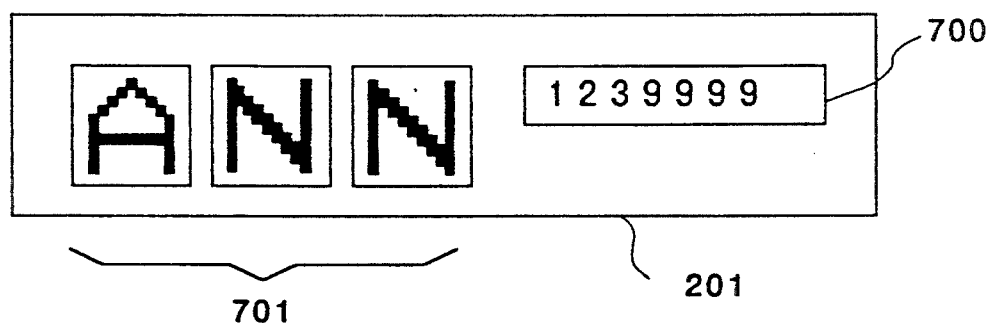
FIG. 12 is a diagram showing an example of a display on an extension telephone.

FIG. 12 shows an example of a display which appears on the display panel 201. The display includes a dial monitor section 700, and an LCD dot section 701 for indicating that the current extension telephone is in the process of acquiring an analog public switched telephone network line.

The control procedure in this telephone exchange system will now be described in accordance with the flowchart of FIG. 8.

When the CPU 122 senses at step S300 that the handset 200 has been taken off the hook, processing proceeds to step S301. If it is sensed at step S300 that the handset has not been taken off the hook but that the speaker key 207 has been pressed at step S400, the program still proceeds to step S301. In case of outside-line default at step S301, i.e., if it is determined at step S301 that a setting has been made such that an outside line is acquired as soon as the handset is taken off the hook, the program proceeds to step S305 in FIG. 8B. On the other hand, if the outside-line default setting has not been made, the CPU 122 waits for depression of one of the outside-line keys 202 (step S302). If "0" is dialed at step S304, this is treated as being a number for initiating outside-line call, and the program proceeds to step S305. If a number other than "0" is dialed, the system waits at step S312 for the next dial input and then initiates intercom call when the dial input operation has been completed.

If the extension at which the operation to initiate a call has been performed is, say, the extension telephone 101, the CPU 122 extracts (step S305) the priorty-acquisition trunk type, classified by extension, that corresponds to the extension telephone 101. In this case, the CPU 122 refers to the memory area M401 and extracts the first data item "1" stored in the memory 123. Next, at step S306, the CPU 122 searches the trunk type setting data (FIG. 10), classified by outside line, for the outside line whose trunk type is "1". In this case, the items of data in memory areas M500 and M501 coincide, and it is determined at step S307 whether either line is free. That is, it is determined whether either of the analog public switched telephone network lines 110, 111 is idle. If neither is idle, the memory area M401 is referred to again at step S308, the trunk type "3" stored following the trunk type "1" is extracted, and the program returns to step S306.

If it is determined at step S308 that there is no trunk type registered next, processing for outside-line acquisition is stopped and a busy tone is sent to the originating extension telephone at step S309.

If an idle line is sensed at step S307, the program proceeds to display processing of step S310, where the CPU 122 selects the data characters corresponding to the trunk type extracted at step S305. For example, if the trunk type is "1", the character data "ANN" in memory area M600 is selected, this data is transferred to the extension telephone and displayed on its display panel. The example of displayed characters is shown in FIG. 12.

The selected outside line is acquired at step S311 and a transition is made to outgoing call processing.

It should be noted that the program proceeds from step S302 to step S310 if any of the eight outside-line buttons 202 whose outside-line lamp 202L is not lit is pressed.

The program proceeds from step S302 to step S310 also when it is detected at step S302 that an outside-line button has been pressed while a busy tone is being transmitted at step S309.

Thus, the telephone exchange system of this embodiment accommodates lines of a plurality of types, and types of lines to be acquired preferentially are registered in the memory 123. When initiating an outgoing call, the CPU 122 selects a line based upon the data registered in the memory 123, causes the selected line to be acquired and thereafter executes call processing in accordance with a key input from the extension telephone.

In a case where lines registered in the memory 123 do not include an idle line, the operator is capable of selecting a line of another type by one of the outside-line keys 202. In this case, the CPU 122 acquires the line corresponding to the pressed outside-line key and executes call processing in accordance with the key input from the extension telephone.

Accordingly, if the operator pre-registers the types of lines often used, operability can be improved. Furthermore, even if a line of a pre-registered type is not idle, a call can be made manually using a line of another type. In other words, the operator is capable of using a line of a different type in an urgent situation.

This embodiment provides the following advantages:

(1) An outside line of a desired trunk type can be acquired by pre-registration, and therefore it is unnecessary to memorize which trunk-type outside line has been assigned to which outside-line button.

(2) Erroneous dialing can be prevented by displaying the trunk type of the acquired outside line. That is, in a case where an analog public switched telephone network line has been acquired directly or a PBX extension line has been acquired when it is desired to access an analog public switched telephone network, it is necessary to input a special number such as "0" if the analog public switched telephone network line accommodated by the PBX is acquired.

(3) If a trunk type not desired to be acquired is not registered, an outside line of this trunk type will not be acquired even if it is idle.

(4) When a desired trunk type is registered and this trunk type is not registered as set data for all other extensions, then only an extension for which the desired trunk type has been registered can acquire an outside line of this trunk type. This makes it possible to realize simple outgoing restriction.

As many apparently widely different embodiments of the present invention can be made without departing from the spirit and scope thereof, it is to be understood that the invention is not limited to the specific embodiments thereof except as defined in the appended claims.

What is claimed is:

1. A line selecting apparatus which accommodates a plurality of external lines of different types, comprising:
   memory means which stores a type of external line to be selected from among said plurality of external lines;
   designating means for manually designating an external line to be selected from among said plurality of external lines; and
   selecting means for selecting the external line of the type stored in said memory means in a first mode, and for selecting the external line designated by said designating means in a second mode.

2. The apparatus according to claim 1, wherein said first mode is an auto-repeat mode.

3. The apparatus according to claim 1, wherein said first mode is an external-line default mode.

4. The apparatus according to claim 1, wherein when the external line of the type stored in said memory means is a plurality of sets of external lines, any one set from among said plurality of sets is selected in said first mode.

5. A communications system which accommodates a plurality of outside lines of different types and a plurality of telephones, wherein when a call is placed to a party via an outside line, the call is repeated when an inability to establish communication with the party is detected, said system comprising:
- storing means for storing correlating information between the types of accommodated outside lines and said outside lines;
- memory means for memorizing the type of outside line at the time the call is placed; and
- calling means which, when it is determined that communication with said party is not possible, refers to the correlating information stored in said storing means for placing the call on an outside line corresponding to the type of outside line that has been memorized by said memory means.

6. The communications system according to claim 5, wherein said calling means has means for detecting a call-repeat command, the call being placed to said party when said means detects said call-repeat command.

7. The communications system according to claim 5, wherein said calling means determines that communication with said party is not possible when said party is busy.

8. The communications system according to claim 5, wherein said calling means determines that communication with said party is not possible when said party does not answer the placed call.

9. A communications system which accommodates a plurality of outside lines of different types and a plurality of telephones, wherein any of the outside lines is selected, said system comprising:
- storing means for storing correlating information between the accommodated telephones and types of outside lines which the telephones acquire preferentially when placing an outside-line call; and
- selecting means for selecting, when placing an outside-line call, an idle outside line among those outside lines that match the correlating information stored in said storing means.

10. The communications system according to claim 9, wherein said storing means stores plural items of correlating information which are ranked, and said selecting means selects an outside line in accordance with the ranking of the correlating information.

11. The communications system according to claim 9, wherein selecting means has means for visibly displaying the type of selected outside line on a telephone.

12. A communications system which accommodates a plurality of outside lines of different types and a plurality of telephones, wherein any of the outside lines is selected, said system comprising:
- storing means for storing correlating information between types of the accommodated outside lines and said outside lines; and
- acquiring means for acquiring an idle outside line among those outside lines that match the correlating information stored in said storing means when placing an outside-line call.

* * * * *

UNITED STATES PATENT AND TRADEMARK OFFICE
CERTIFICATE OF CORRECTION

PATENT NO. : 5,153,908
DATED : October 6, 1992
INVENTOR(S) : KATSUHIRO KAKIZAWA, ET AL.

It is certified that error appears in the above-identified patent and that said Letters Patent is hereby corrected as shown below:

COLUMN 3

Line 36, "time division" should read --time-division--.

COLUMN 3

Line 55, "(1-6)in" should read --(1-6) in--.

COLUMN 4

Line 13, "phone 22" should read --phone 2--.

COLUMN 6

Line 43, "line 100." should read --line 110.--.

UNITED STATES PATENT AND TRADEMARK OFFICE
CERTIFICATE OF CORRECTION

PATENT NO. : 5,153,908

DATED : October 6, 1992

INVENTOR(S) : KATSUHIRO KAKIZAWA, ET AL.

It is certified that error appears in the above-identified patent and that said Letters Patent is hereby corrected as shown below:

<u>COLUMN 7</u>

Line 12, "case of" should read --the case of an--.
Line 19, "(step S302). If" should read
--(step S302) or for an input from the ten-key
pad 203 (step S303). If--.

<u>COLUMN 10</u>

Line 19, "selecting means" should read
--said selecting means--.

Signed and Sealed this

Seventh Day of December, 1993

Attest:

BRUCE LEHMAN

Attesting Officer

Commissioner of Patents and Trademarks